United States Patent
Sareen et al.

(10) Patent No.: US 10,027,574 B2
(45) Date of Patent: Jul. 17, 2018

(54) REDUNDANT PATHWAYS FOR NETWORK ELEMENTS

(71) Applicants: Jatin Sareen, New Delhi (IN); Waseem Reyaz Khan, Gurgaon (IN); Rajagopalan Kannan, Gurgaon (IN); Brian Moore, Ottawa (CA)

(72) Inventors: Jatin Sareen, New Delhi (IN); Waseem Reyaz Khan, Gurgaon (IN); Rajagopalan Kannan, Gurgaon (IN); Brian Moore, Ottawa (CA)

(73) Assignee: Ciena Corporation, Hanover, MD (US)

( * ) Notice: Subject to any disclaimer, the term of this patent is extended or adjusted under 35 U.S.C. 154(b) by 484 days.

(21) Appl. No.: 14/621,083

(22) Filed: Feb. 12, 2015

(65) Prior Publication Data

US 2016/0173367 A1 Jun. 16, 2016

(30) Foreign Application Priority Data

Dec. 15, 2014 (IN) .......................... 3708/DEL/2014

(51) Int. Cl.
*H04L 12/707* (2013.01)
*H04L 12/703* (2013.01)

(52) U.S. Cl.
CPC .............. *H04L 45/22* (2013.01); *H04L 45/28* (2013.01); *H04L 2212/00* (2013.01)

(58) Field of Classification Search
CPC ....... H04L 12/707; H04L 12/703; H04L 1/08; H04L 45/48; H04L 12/26; H04L 45/02; H04W 40/30; H04W 8/04; H04W 84/005; H04W 48/08; H04W 80/04; H04W 36/34; H04W 48/16; H04W 88/16; H04W 36/14; H04W 48/17; H04W 36/005; G01R 31/08
See application file for complete search history.

(56) References Cited

U.S. PATENT DOCUMENTS

| | | | | |
|---|---|---|---|---|
| 6,718,383 | B1* | 4/2004 | Hebert | H04L 45/22 709/221 |
| 2005/0128940 | A1* | 6/2005 | Wen | H04L 12/42 370/216 |
| 2005/0190778 | A1* | 9/2005 | Ozluturk | H04L 45/22 370/406 |
| 2005/0232146 | A1* | 10/2005 | Lee | H04L 45/04 370/225 |
| 2012/0307629 | A1* | 12/2012 | Vasseur | H04L 45/34 370/228 |

* cited by examiner

*Primary Examiner* — Kwang B Yao
*Assistant Examiner* — Hardikkumar Patel
(74) *Attorney, Agent, or Firm* — Osha Liang LLP

(57) ABSTRACT

A method for establishing an alternate pathway to an endpoint that may determine that a network connection is lost between a first network element and an application server. The method may select a second network element from a virtual network operating on an optical network. The second network element may include a network connection over the optical network to the application server, and a network connection to the first network element over the virtual network. The method may designate the second network element to act as a network proxy to the first network element. The first network element may use the second network element as the network proxy for receiving data over the virtual network. The method may receive data from the application server at the first network element using the second network element as the network proxy.

16 Claims, 7 Drawing Sheets

REDUNDANT PATHWAYS FOR NETWORK ELEMENTS

CROSS REFERENCE TO RELATED APPLICATIONS

This application claims benefit under 35 U.S.C. § 119(a) to Indian Patent Application Serial Number 3708/DEL/2014, filed on Dec. 15, 2014 and entitled, "REDUNDANT PATHWAYS FOR NETWORK ELEMENTS." Indian Patent Application Serial Number 3708/DEL/2014 is incorporated herein by reference in its entirety.

BACKGROUND

Many networks may have changing topologies. For instance, the logical path that a single node uses to communicate with a distant node may change regularly within a network. New nodes may join the network, while old nodes may be taken offline, either as planned or unexpectedly. As such, the route that packets take from one node to another node may need to be regularly reconfigured by the network to account for changing circumstances.

SUMMARY

In general, in one aspect, embodiments disclosed herein relate to a method for establishing an alternate pathway to an endpoint, comprising determining that a network connection is lost between a first network element and an application server; selecting a second network element from a virtual network operating on an optical network, the second network element comprising a network connection over the optical network to the application server, and a network connection to the first network element over the virtual network, wherein the virtual network establishes a network link between the first network element and the second network element; designating the second network element to act as a network proxy to the first network element, wherein the first network element uses the second network element as the network proxy for receiving data over the virtual network; and receiving data from the application server at the first network element using the second network element as the network proxy.

In general, in one aspect, embodiments disclosed herein relate to a system for establishing an alternate pathway to an endpoint, comprising an optical network comprising a first network element, and a second network element; a virtual network operating on the optical network, wherein the virtual network is configured for establishing a network link between the first network element and the second network element, and wherein the second network element is configured to act as a network proxy for sending data to the first network element over the virtual network.

In general, in one aspect, embodiments disclosed herein relate to a non-transitory computer readable medium storing instructions for establishing an alternate pathway to an endpoint, the instructions, when executed by a computer processor, comprising functionality to determine that a network connection is lost between a first network element and an application server; select a second network element from a virtual network operating on an optical network, the second network element comprising a network connection over the optical network to the application server, and a network connection to the first network element over the virtual network, wherein the virtual network establishes a network link between the first network element and the second network element; designate the second network element to act as a network proxy to the first network element, wherein the first network element uses the second network element as the network proxy for receiving data over the virtual network; and receive data from the application server at the first network element using the second network element as the network proxy.

Other aspects of the invention will be apparent from the following description and the appended claims.

DETAILED DESCRIPTION

Figure 1:
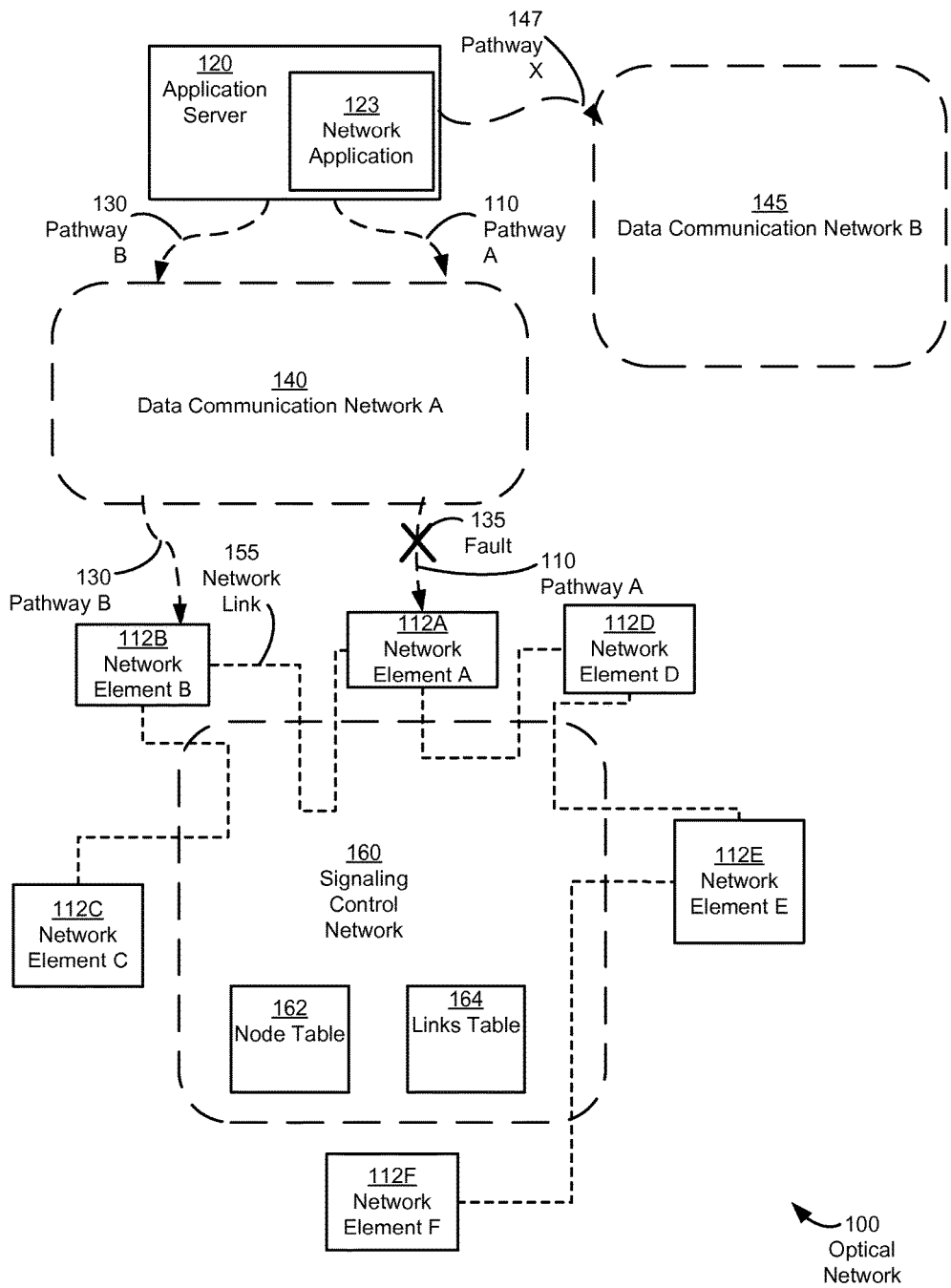
FIG. 1 shows a system in accordance with one or more embodiments.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention provide a system, a method, and a computer readable medium for establishing an alternate pathway to an endpoint. After determining that a network connection is lost over a data communication network on an optical network between an application server and a network element, the application server or the network element may designate a different network element to act as a network proxy for the network element with the lost network connection. The network proxy may receive data from the application server over the data communication network and forward the data to the network element with the lost network connection over a signaling control network.

FIG. 1 shows a system for establishing an alternate pathway to an endpoint in accordance with one or more embodiments. As shown in FIG. 1, an optical network (100)

may include an application server (120), a data communication network (DCN) A (140), a data communication network B (145), a signaling control network (SCN) (160) and multiple network elements, such as Network Element A (112A), Network Element B (112B), Network Element C (112C), Network Element D (112D), Network Element E (112E) and Network Element F (112F). Nodes in the optical network (100), e.g., the network elements, may be connected photonically, such as fiber-optic cables. Specifically, the network elements may include components such as optical switches, routers, hubs or any other logical entities for uniting one or more physical devices on the optical network (100). An optical routing protocol, such as the Optical Signaling and Routing Protocol (OSRP), may be operating over the optical network (100) for managing the sending and receiving of data between the network elements. As such, the network elements (150) may communicate with each other over changing physical paths using different nodes within the optical network (100). For communicating data, the network elements may transmit data between each other using in-band communication on individual fiber-optic cables, such as through a data communication channel (DCC) or a general communication channel (GCC) protocol. For relaying data from one network element to another network element, network links between individual network elements may be organized by the signaling control network (160).

In one or more embodiments, the application server (120) executes a network application (123) with respect to various network elements in the optical network (100). For example, the network application (123) may include various network management system (NMS) functions, such as processes performed by a software-defined network (SDN) controller (not shown), performed over the Data Communication Network A (140) or the Data Communication Network B (145). Furthermore, the application server (120) may operate on a centralized server machine (not shown). For example, the centralized server machine may correspond to a desktop personal computer (PC), a laptop, a hardware server, a mainframe, a kiosk, a cable box, or any other computing hardware device. In one or more embodiments, the application server (120) may correspond to multiple hardware devices operatively connected using a network with wired and/or wireless segments. For more information regarding the operation of the application server (120) or the network elements, see FIG. 8 and the accompanying description.

In one or more embodiments, the Data Communication Network A (140) or the Data Communication Network B (145) (which may also be referred to as a management control networks (MCN)) includes software frameworks that provide for the transmission of data between endpoints over the optical network (100), e.g., the application server (120) and/or one of the network elements. For instance, the application server (120) may establish one or more logical pathways through the Data Communication Network A (140) or the Data Communication Network B (145), such as Pathway A (110), Pathway B (130) and/or Pathway X (147). Specifically, the Pathway A (110) may connect the application server (120) with Network Element A (112A), while the Pathway B (130) may connect the application server (120) with the Network Element B (112B). As such, data communication networks (e.g., Data Communication Network A (140) or the Data Communication Network B (145)) may provide a direct Ethernet connection between specific endpoints over the optical network (100). In particular, the Data Communication Network A (140) may use the Internet Protocol (IP) to send data in packets from a source address (e.g., an address for the application server (120)) to a destination address (e.g., the address of Network Element B (112B) or Network Element C (112C)). For more information regarding packet communication, see FIGS. 3A-3C.

In one or more embodiments, the signaling control network (160) is a virtual network operating in the link layer of the optical network (100). As such, the signaling control network (160) may establish individual links between neighboring network elements in the optical network (100). For instance, as shown in FIG. 1, the signaling control network (160) may manage network links between the Network Element B (112B) and the Network Element C (112C), between the Network Element C (112C) and the Network Element D (112D), between the Network Element D (112D) and the Network Element E (112E), between the Network Element E (112E) and the Network Element F (112F), and/or between the Network Element A (112A) and the Network Element B (112B). As such, the signaling control network (160) may implement a decentralized mesh protocol constituting a control plane for organizing, monitoring and initiating network links between neighboring network elements. Furthermore, the signaling control network (160) may regularly communicate with each of the network elements as well as the application server (120) to maintain various network links.

Furthermore, the signaling control network (160) may include a node table (162) and a links table (164) to monitor and manage existing network links over the optical network (100). As such, the node table (162) may identify a particular node (e.g., a name of a network element), an optical signaling and routing protocol (OSRP) address for the node, and an Internet Protocol (IP) address for reaching the node. Furthermore, the link table (164) may describe a listing of nodes that are directly connected (e.g., over a single network hop). To build or update the node table (162) and/or link table (164), network elements may advertise nodal level routing attributes over the signaling control network (160). Specifically, nodal level routing attributes may be broadcast without regard to whether the broadcasting network element has a network connection over the data communication network A (140). For instance, an Ethernet connection between the application server (120) and Network Element A (112A) may be down, but Network Element A (112A) may continue to transmit routing and/or link information over the signaling control network (160).

In one or more embodiments, a fault (135) in the optical network (100) occurs when a network connection along Pathway A (110) is lost (i.e., a network connection loses connectivity as a result of a fault or disruption). For example, the fault (135) may be a physical break (i.e., destroyed cable) on an optical fiber line that causes the Pathway A (110) to lose connectivity over the Data Communication Network A (140). In another instance, the fault (135) may include an inoperative intervening node on the Pathway A (110) between a source node (i.e., the applications server (120)), and a destination node (i.e., Network Element A (112A)). As such, the fault (135) may be any network occurrence that causes a network connection to fail between endpoints on the optical network (100).

In one or more embodiments, the Network Element B (112B) serves as a network proxy for the Network Element A (112A). For example, when the Pathway A (110) is broken over the Data Communication Network A (140) as a result of the fault (135), the application server (120) or Network Element A (112A) may designate a different network element, e.g., the Network Element B (112B), to act as the network proxy for the Data Communication Network A (140). As such, the network proxy may act as an alternate gateway to the Data Communication Network A (140) for Network Element A (112A). In other words, the network proxy may provide a communication interface between the Data Communication Network A (140) and a network element disconnected from the Data Communication Network A (140). The application server (120) may then communicate with the Network Element A (112A) without regard to the fault (135) on the Pathway A (110). Specifically, the Network Element B (112B) may receive data from the applications server (120) which is bound for the Network Element A (112A). Upon receiving the data, the Network Element B (112B) may forward the received data over the signaling control network (160) using a network link (155) that connects the Network Element B (112B) with the Network Element A (112A). The network link (155) may be a physical and/or logical component that enables communication between nodes, e.g., the Network Element B (112B) and the Network Element A (112A), on a particular network. As such, a series of network links between various network elements may form a logical pathway, which may be managed and initiated by the signaling control network (160).

Figure 2:
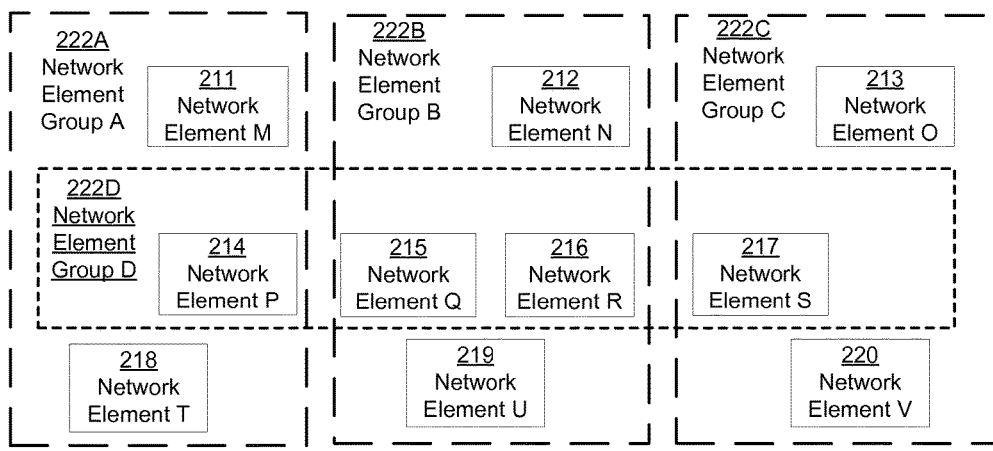
FIG. 2 shows a plurality of predefined groups of network elements in accordance with one or more embodiments.

FIG. 2 shows various predefined groups of network elements in accordance with one or more embodiments. For instance, various network elements may include Network Element M (211), Network Element N (212), Network Element O (213), Network Element P (214), Network Element Q (215), Network Element R (216), Network Element S (217), Network Element T (218), Network Element U (219) and Network Element V (220). Among these network elements, a limited number of potential network proxies may exist in the network. As such, network elements may be divided into network element groups (also referred to as confederations) for classifying which network elements may act as network proxies for other network elements. For instance, the network elements in FIG. 2 are divided into a Network Element Group A (222A), a Network Element Group B (222B), a Network Element Group C (222C), and a Network Element Group D (222D).

When a network connection is lost to a particular network element in a respective network element group, the application server (120) or the particular network element may select a different member of the respective network group to be a network proxy until a connection over a data communication network is reestablished. If Network Element M (211) loses its connection to the application server (120), other network elements in the same network element group (e.g., Network Element P (214) and Network Element T (218)), may be used as network proxies for Network Element M (211).

In one or more embodiments, network element groups correspond to individual subnets of network elements. The network element groups may also be designated based on which network elements have direct neighboring links with each other over the signaling control network (160). The network element groups may partition the optical network (100) to distribute network traffic within the signaling control network (160). In one or more embodiments, a particular network element is a member of multiple network element groups, e.g., Network Element P (214) is a member of Network Element Group A (222A) and Network Element Group D (222D). Overlapping network element groups may provide support for the optical network (100) where multiple network elements lose their connection to the application server (120). However, some network elements, e.g., Network Element N (212) or Network Element V (220), may be a member of only a single network element group.

Figure 3A:
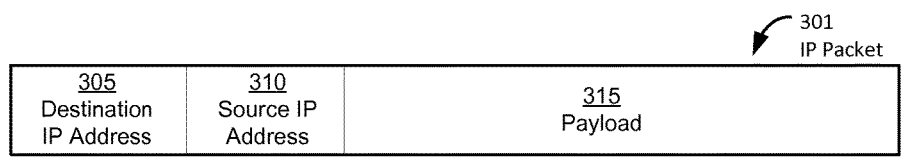
FIG. 3A, FIG. 3B, and FIG. 3C show packet structures in accordance with one or more embodiments.
Figure 3B:
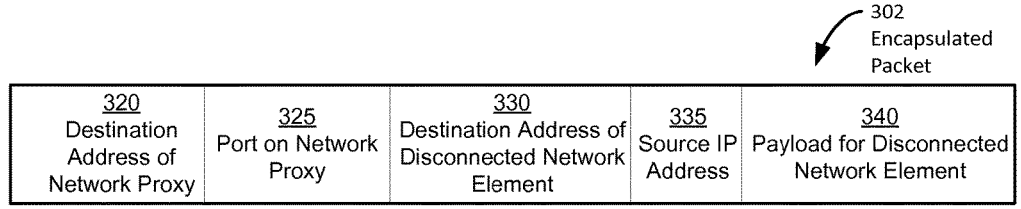
Figure 3C:
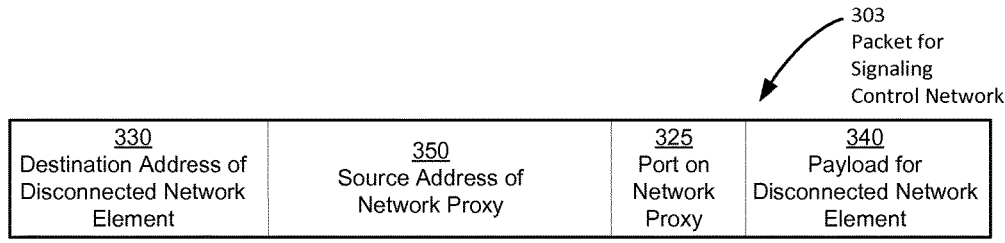

FIGS. 3A-3C show various packet structures in accordance with one or more embodiments. An Internet Protocol (IP) packet (301) is shown in FIG. 3A. The IP packet (301) may include a destination IP address (305), a source IP address (310) and a payload (315). The destination IP address (305) may describe the final destination where the IP packet (301) is sent over a network. The source IP address (310) may describe which network element is sending the IP packet (301). The payload (315) may be data or a message carried on behalf of the IP packet (301). Referring back to FIG. 1, when the Pathway A (110) is operating without problems, the IP packet (301) may be used for sending data over the Data Communication Network A (140) to Network Element A (112A).

Referring to FIG. 3B, the encapsulated packet (302) may include a destination address of a network proxy (320), a specified port on the network proxy (325), a destination address of a disconnected network element (330), a source IP address (335) and a payload for the disconnected network element (340). The destination address of the network proxy (320) may describe which network element in the optical network (100) is to receive the encapsulated packet (302). The destination address of the disconnected network element (330) may identify the destination on the signaling control network (160). The source IP address (335) may describe the sender of the encapsulated packet (302).

Referring back to FIG. 1, when the Pathway A (110) is lost due to the fault (135), the application server (120) may switch to an encapsulated packet (302) to use the Network Element B (112B) as a network proxy for the Data Communication Network A (140).

Referring to FIGS. 3B and 3C, the packet for the signaling control network (303) may include data that was in the encapsulated packet (302), such as the destination address of the disconnected network element (330), the specified port on the network proxy (325) and the payload for the disconnected network element (340). However, the network proxy may now be the sender of the packet (303), and as such the packet for the signaling control network (303) may include a source address of the network proxy (350). After the network proxy receives the packet (302) shown in FIG. 3B, the network proxy may decapsulate the packet (302) and transmit the data over the signaling control network in a packet for the signaling control network (303) as shown in FIG. 3C.

Figure 4:
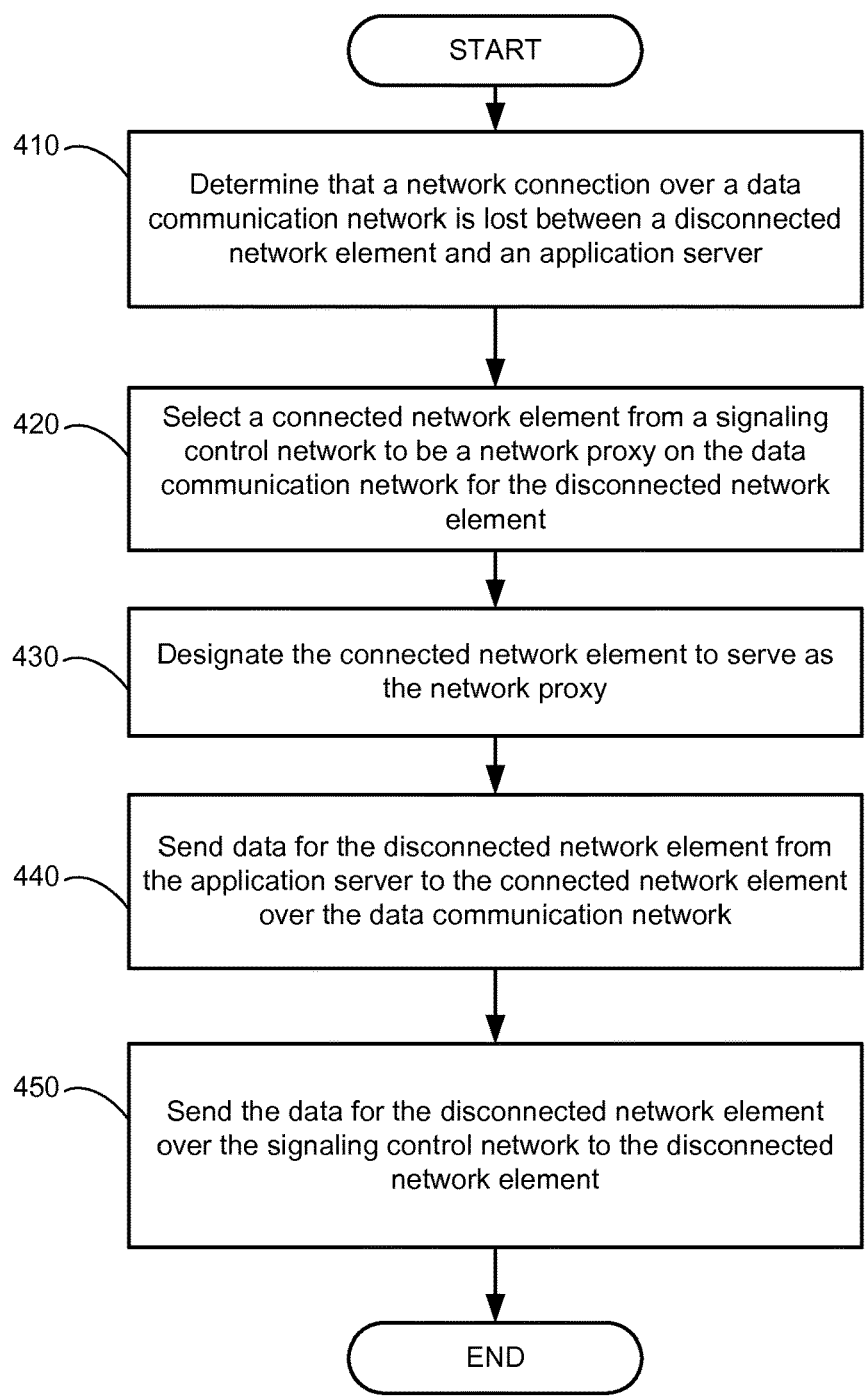
FIG. 4, FIG. 5, and FIG. 6 show flowcharts in accordance with one or more embodiments.

FIG. 4 shows a flowchart for establishing an alternate pathway to an endpoint in accordance with one or more embodiments. One or more steps in FIG. 4 may be executed by components of the optical network (100) (discussed in reference to FIG. 1). The sequence of steps shown in FIG. 4 may differ among embodiments, and one or more of the steps may be performed in parallel and/or may be optional. Moreover, one or more steps in FIG. 4 may be repeated. Accordingly, the scope of the invention should not be considered limited to the specific arrangement of steps shown in FIG. 4.

In STEP 410, a determination is made to determine whether a network connection is lost over a data communication network between a disconnected network element and an application server. For instance, the disconnected network element or the application server may detect a fault or disruption in a logical pathway over an optical network. Specifically, the disconnected network element or the application server may transmit a message over the data communication network and determine whether connectivity exists based on whether an acknowledgment or another response is received that corresponds to the transmitted message.

In STEP 420, a connected network element is selected from a signaling control network to act as a network proxy on the data communication network for the disconnected network element. For instance, a network element may be selected that has both a network connection to the application server over the data communication network as well as a network connection to the disconnected network element over the signaling control network.

In one or more embodiments, a network element is selected from the disconnected network element's neighboring nodes that have the least amount of link delay amongst the neighboring nodes. In one or more embodiments, the selected network element is chosen based on whether the disconnected network element belongs to one or more network element groups similar to the ones described in FIG. 2. Upon identifying a network element group that contains the disconnected network element, the selection process in STEP 420 may determine whether one or more members of the corresponding network element group have a network connection to the application server over the data communication network. As such, the selection process in STEP 420 may choose accordingly from among those members in the corresponding network element group.

In one or more embodiments, network elements are selected to be a network proxy for the disconnected network element in a round robin manner. For instance, rather than designate the connected network element as a permanent network proxy until the disconnected network element reestablishes a direct connection over the data communication network, neighboring network elements may take turns being the network proxy for the disconnected network element. For example, a single turn of being the network proxy may last for an allotted amount of time. After the allotted time expires, a new network proxy is selected from the disconnected network element's neighbors. As such, the round robin selection process may provide for multiple network links to be used to send data over the signaling control network to the disconnected network element. Using multiple network links may also prevent saturation of a particular GCC/DCC protocol channel, which may cause a reduction in throughput over a network because of the GCC/DCC channel size.

In STEP 430, the connected network element is designated to act as the network proxy for the data communication network. In response to being selected in STEP 420, the connected network element may receive a message from the disconnected network element to act as the network proxy. For instance, the message may be a provisioning command that designates a unique port on the connected element to be used for communicating with the disconnected network element. In one or more embodiments, the message initiates from the application server. For more information regarding the designation process, see FIGS. 5 and 6.

In STEP 440, the application server sends data for the disconnected network element to the connected network element over the data communication network. Specifically, the connected network element may receive one or more encapsulated packets from the application server that contain data meant for the disconnected network element.

In STEP 450, the connected network element sends the data for the disconnected network element over the signaling control network to the disconnected network element. When the data for the disconnected network element is contained in an encapsulated packet, the connected network element may decapsulate the data from the encapsulated packets, and forward the data to the disconnected network element over the signaling control network.

Figure 5:
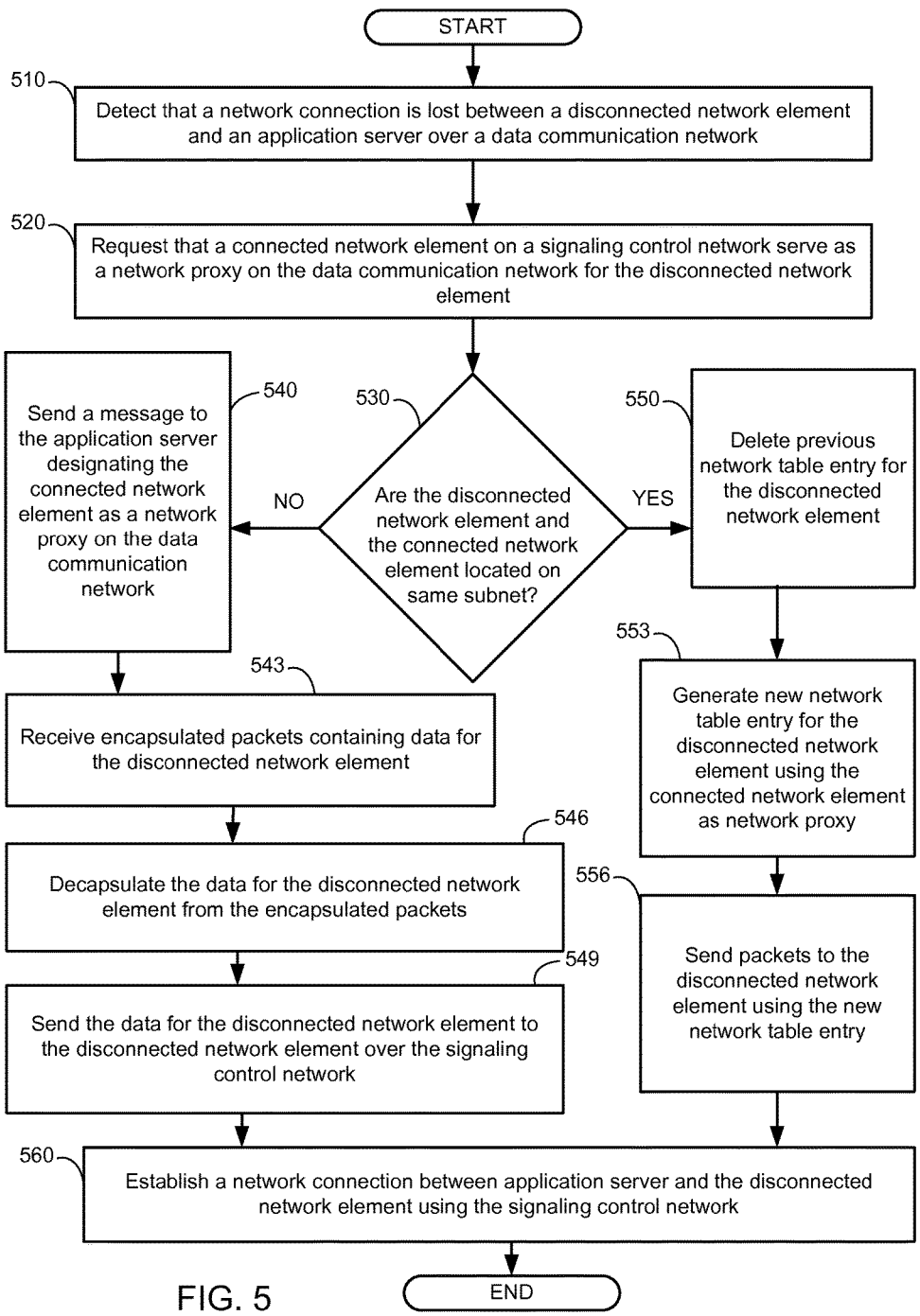

FIG. 5 shows a flowchart for establishing an alternate pathway to an endpoint in accordance with one or more embodiments. One or more steps in FIG. 5 may be executed by components of the optical network (100) (discussed above in reference to FIG. 1). The sequence of steps shown in FIG. 5 may differ among embodiments, and one or more of the steps may be performed in parallel and/or may be optional. Moreover, one or more steps in FIG. 5 may be repeated. Accordingly, the scope of the invention should not be considered limited to the specific arrangement of steps shown in FIG. 5.

In STEP 510, a disconnected network element detects that a network connection is lost over a data communication network with an application server. For instance, the disconnected network element may detect a fault in the pathway to the application server over the data communication network. Specifically, the disconnected network element may poll the data communication network, e.g., using the Internet Control Message Protocol (ICMP). As such, the disconnected network element may ping a check towards the application server to discover the fault. The disconnected network element may send a packet to the application server, and determine the existence of a fault based on whether a timeout occurs before an acknowledgment is returned from the application server. Furthermore, the disconnected network element may have a port alarm if the fault is located in an optical fiber directly connected to the disconnected network element.

In STEP 520, the disconnected network element requests that a connected network element on the signaling control network act as a network proxy on the data communication network for the disconnected network element. For instance, the disconnected network element may determine whether a neighboring network element has a network connection to the application server. As such, the disconnected network element may search for neighboring network elements located on the signaling control network. Upon finding a neighboring network element with a network connection to the application server, the disconnected network element may select the neighboring network element to act as a network proxy.

In STEP 530, a determination is made whether the disconnected network element and the connected network element are located on the same subnet. When it is determined that both network elements are on the same subnet, the process proceeds to STEP 550. When both network elements are on different subnets, the process proceeds to STEP 540.

In STEP 540, the disconnected network element sends to the application server a message designating the connected network element as the network proxy. For instance, the disconnected network element may use the signaling control network to send a message to the application server requesting that the application server use the connected network element as a network proxy. In STEP 543, the connected network element receives one or more encapsulated packets (in a form similar to those shown and described in relation to FIGS. 3A-3C) that contain data destined for the disconnected network element. In STEP 546, the second network element decapsulates the data destined for the first network element from the one or more encapsulated packets. In STEP 549, the second network element sends the data for the disconnected network element over the signaling control network to the disconnected network element.

In STEP 550, upon determining the disconnected network element and the connected network element are located on the same subnet, a previous network table entry for the disconnected network element is deleted. For instance, the disconnected network element may send a message to the signaling control network to update or change routing information (e.g., node or links information) for the subnet in the local node table or link table used by the signaling control network. Specifically, the message may be an address resolution protocol (ARP) request configured to remove the old ARP entry. As such, a logical pathway corresponding to the lost network connection referenced in STEP 510 may be deleted for the disconnected network element. In STEP 553, a new network table entry is generated for the disconnected network element using the connected network element as the network proxy. In particular, the signaling control network may modify its node table or link table to route packets from the application server with the disconnected network element address through the connected network element to the disconnected network element. In STEP 556, the application server sends packets to the disconnected network element through the connected network element based on the new network table entry.

In STEP 560, a network connection is established over the data communication network between the application server and the disconnected network element using the signaling control network.

In one or more embodiments, the disconnected network element reestablishes a direct network connection (i.e., a logical pathway using the data communication server) to the application server. For instance, the disconnected network element may receive a packet transmitted directly over the data communication network. The disconnected network element may use polling, e.g., ICMP poll, to verify whether a network connection without the network proxy has been restored over the data communication network. The disconnected network element may also use a port alarm to verify whether the detected fault has been fixed. The network element may send a message to the application server that causes the application server to send future data through the data communication network to the formerly disconnected network element and without using the network proxy.

In one or more embodiments, after a direct connection is reestablished using a pathway over the data communication network, the network element sends a message to the connected network element configured to stop the connected network element from acting as a network proxy. The message may also include a specified timeout to handle any pending messages that may be designated for the formerly disconnected network element that are being transmitted over the data communication network.

Figure 6:
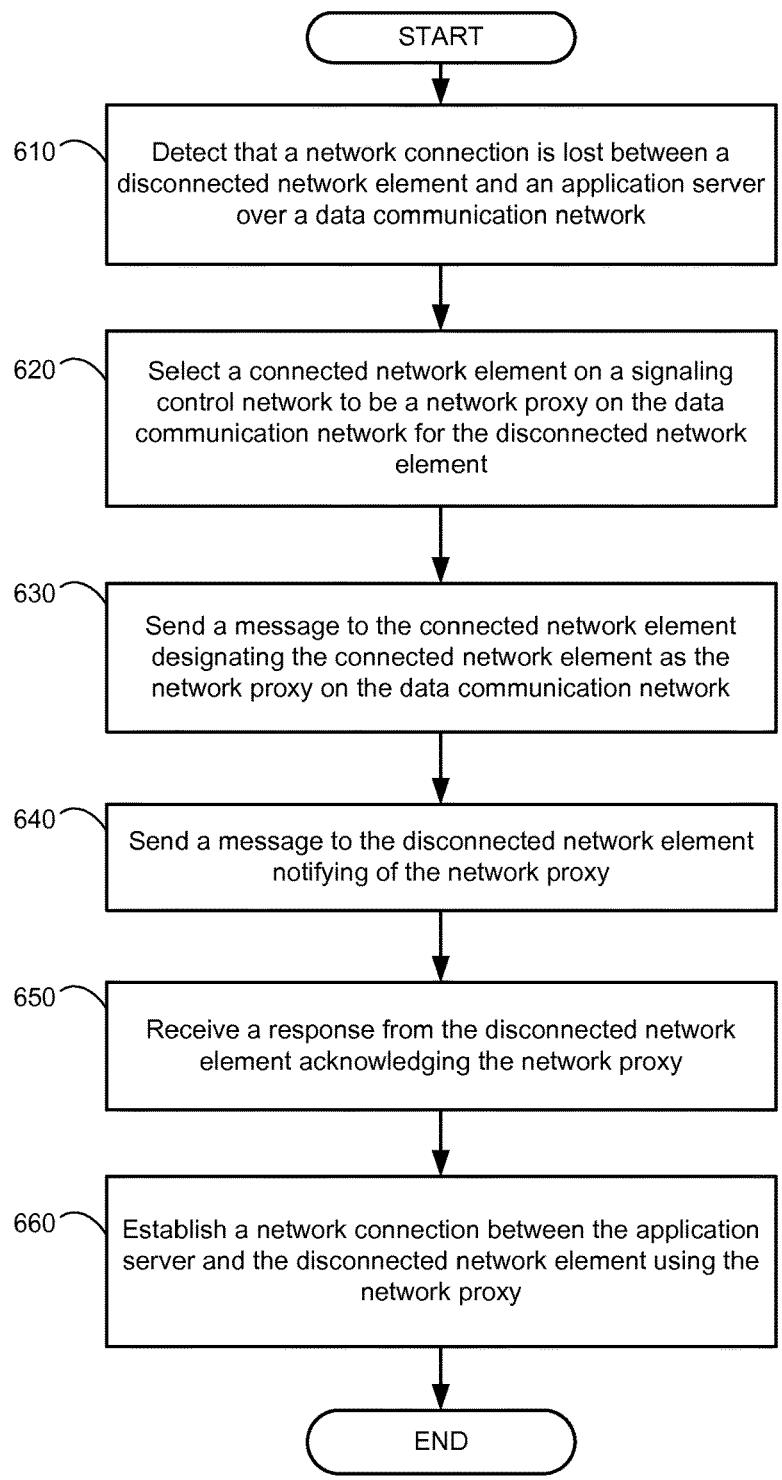

FIG. 6 shows a flowchart for establishing an alternate pathway to an endpoint in accordance with one or more embodiments. One or more steps in FIG. 6 may be executed by components of the optical network (100) (discussed in reference to FIG. 1). The sequence of steps shown in FIG. 6 may differ among embodiments, and one or more of the steps may be performed in parallel and/or may be optional. Moreover, one or more steps in FIG. 6 may be repeated. Accordingly, the scope of the invention should not be considered limited to the specific arrangement of steps shown in FIG. 6.

In STEP 610, an application server detects that a network connection is lost on a data communication network between a disconnected network element and an application server. For instance, the application server may detect a fault in the data communication network. The application server may use ICMP polling with one or more network elements to verify if any network elements have lost a network connection. Furthermore, the application server may send a message to the disconnected network element, and determine the existence of a fault based on a timeout occurring before a response or acknowledgment to the message.

In STEP 620, the application server selects a connected network element from a signaling control network to act as a network proxy on the data communication network for the disconnected network element. For instance, the application server may retrieve node table and/or links table information from the signaling control network to locate a network element that may work as a network proxy for the disconnected network element. In one or more embodiments, the signaling control network broadcasts one or more available network elements for use as a network proxy for the disconnected network element. As such, the application server may choose from one of the available network proxies in the selection process in STEP 620.

In STEP 630, the application server sends to the connected network element a message that designates the second network element as the network proxy. For instance, the message may be a provisioning command to the connected network element that maps the disconnected network element to a unique port on the connected network element.

In STEP 640, the connected network element sends to the disconnected network element a message notifying that the connected network element is the network proxy.

In STEP 650, the disconnected network elements send acknowledging the connected network element as the network proxy. For instance, if a unique port on the connected network element is designated for use a gateway to the data communication network, the disconnected network element may send message through the unique port to the application server.

In STEP 660, a network connection is established between the application server and the disconnected network element using the signaling control network. As such, the disconnected network element and the application server may communicate by sending data back and forth through the connected network element over the signaling control network.

In one or more embodiments, if a direct network connection is reestablished between the disconnected network element and the application server in the future, the application server sends a message to the connected network element that stops the connected network element from acting as the network proxy. The message may include a specified time when the connected network element stops acting as the network proxy, which may allow remaining packets in the data communication network to be transmitted to the formerly disconnected network element.

Figure 7:
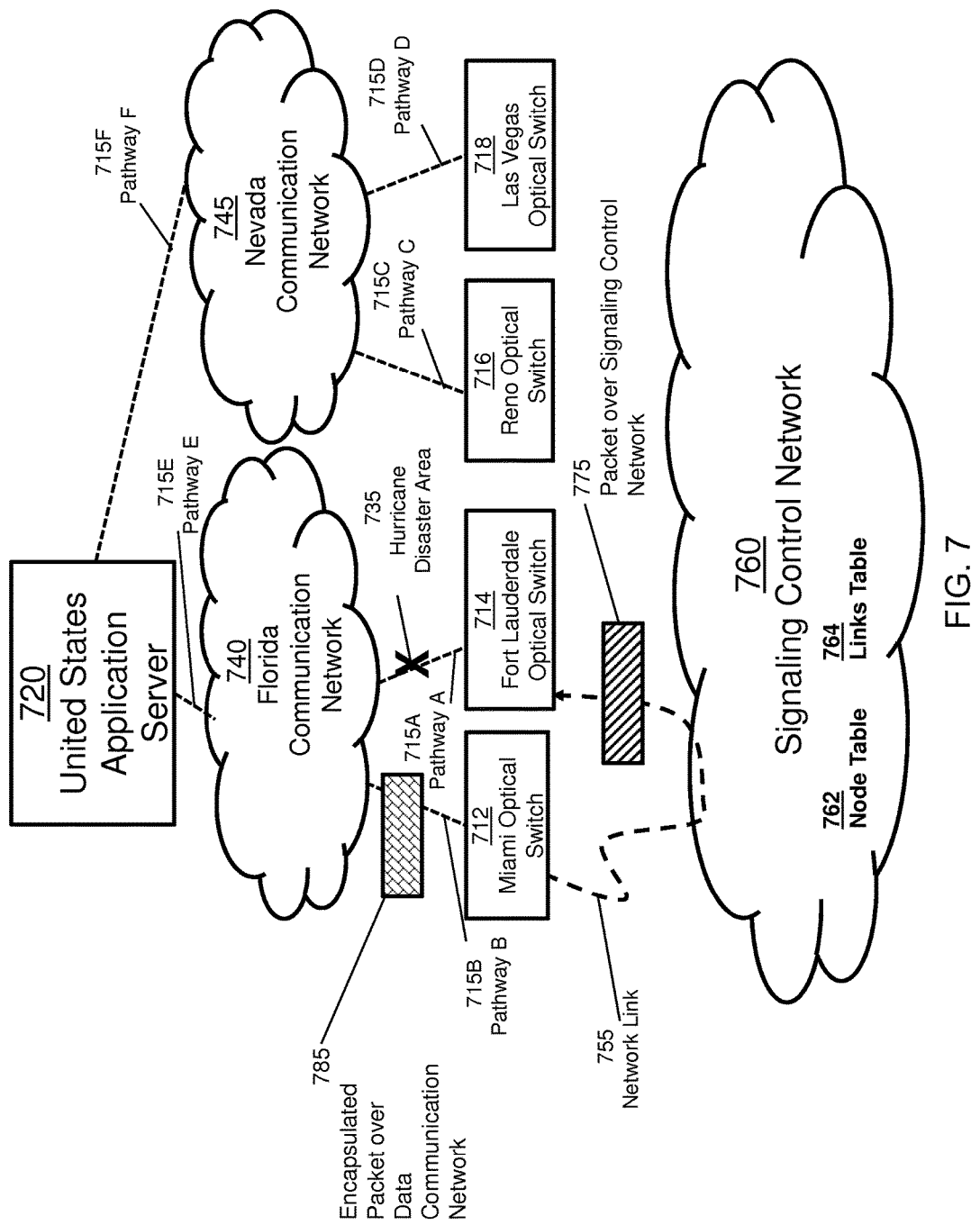
FIG. 7 shows an example in accordance with one or more embodiments.

FIG. 7 provides an example of using an alternate pathway to an endpoint. The following example is for explanatory purposes only and not intended to limit the scope of the invention.

In FIG. 7, a system is shown that includes a United States Application Server (720) that is connected to a Florida Communication Network (740) and a Nevada Communication Network (745). Through the two communication networks, United States Application Server (720) may send data to a Miami Optical Switch (712), a Fort Lauderdale Optical Switch (714), a Reno Optical Switch (716) and a Las Vegas Optical Switch (718) over Pathway B (715B), Pathway A (715A), Pathway C (715C), Pathway D (715D), Pathway E (715E) and Pathway F (715F), respectively. In a lower network layer of the system is a Signaling Control Network (760) managing the node table (762) and links table (764).

As a result of an unlucky summer, part of the area covered by the Florida Communication Network (740) was impacted by a hurricane. Specifically, the Pathway A (715A), which included nodes through a Hurricane Disaster Area (735), has been disrupted with uprooted fiber-optic cables, power outages, etc. As such, the Fort Lauderdale Optical Switch (714) lost connectivity to the United States Application Server (720) as the Pathway A (715A) no longer provides any network connectivity. To overcome the failed connection, the United States Application Server (720) designates Miami Optical Switch (712) as a network proxy while the Hurricane Disaster Area (735) is being repaired. The Miami Optical Switch (712) receives encapsulated packets (785) containing messages for Fort Lauderdale from the United States Application Server (720). The Miami Optical Switch (712) then forwards the messages for Fort Lauderdale in packets (775) over the Signaling Control Network (760) in a network link (755) to the Fort Lauderdale Optical Switch (714).

Figure 8:
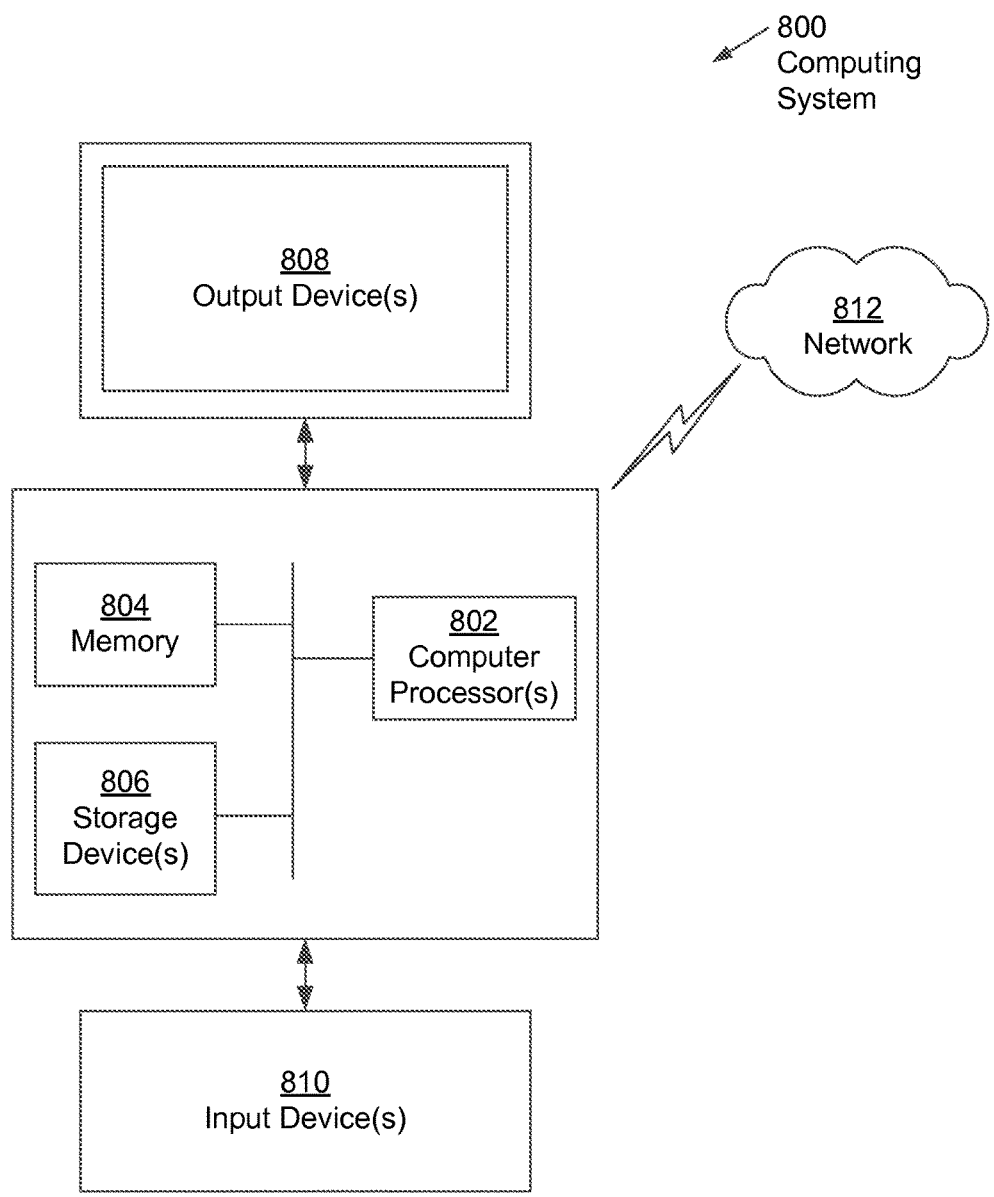
FIG. 8 shows a computer system in accordance with one or more embodiments.

Embodiments of the invention may be implemented on a computing system. Any combination of mobile, desktop, server, embedded, or other types of hardware may be used. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor(s) (802) may be an integrated circuit for processing instructions.

For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (814) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments of the invention.

Further, one or more elements of the aforementioned computing system (800) may be located at a remote location and connected to the other elements over a network (814). Further, embodiments of the invention may be implemented on a distributed system having a plurality of nodes, where each portion of the invention may be located on a different node within the distributed system. In one embodiment of the invention, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for establishing an alternate pathway to an endpoint, comprising:
   determining that a network connection is lost over a data communication network between a first network element and an application server;
   selecting a second network element from a virtual network operating on an optical network, the second network element comprising a network connection over the optical network to the application server, and a network connection to the first network element over the virtual network, wherein the virtual network implements a decentralized mesh protocol in a control plane that establishes a network link between the first network element and the second network element, and wherein the decentralized mesh protocol initiates network links between neighboring network elements;
   designating the second network element to act as a network proxy to the first network element;
   sending, over the data communication network, data encapsulated in a first packet from the application server to the second network element;
   encapsulating, using the control plane and at the second network element, the data into a second packet; and
   receiving, over the control plane implemented by the virtual network, the data encapsulated in the second packet at the first network element using the second network element as the network proxy for the data.

2. The method of claim 1, further comprising:
   detecting, by the first network element, a fault between the first network element and the application server.

3. The method of claim 1,
   wherein the virtual network transmits routing information between the first network element and the second network element.

4. The method of claim 1, further comprising:
   sending a message to the application server, wherein the message causes the application server to use the second network element as the network proxy.

5. The method of claim 1, further comprising:
   determining whether the second network element shares a subnet with the first network element; and
   when the first network element and the second network element share the subnet, sending a message to the virtual network, wherein the message modifies a node table or a link table for the subnet to route the data from the application server to the first network element through the second network element.

6. The method of claim 1,
wherein the optical network comprises a plurality of network elements divided into a plurality of predefined groups of network elements, and
wherein selecting the second network element from the virtual network comprises:
determining that the first network element is a member of at least one of the plurality of predefined groups, and
selecting a network element that is a member of the at least one of the predefined groups.

7. The method of claim 1, wherein the first network element or the second network element is an optical switch.

8. The method of claim 1, wherein the virtual network modifies information stored in the optical network.

9. A system for establishing an alternate pathway to an endpoint, comprising:
an optical network, comprising:
a first network element, and
a second network element,
wherein the second network element comprises a network connection over the optical network to an application server, and
wherein the optical network is configured to:
determine that a network connection is lost over a data communication network between the first network element and the application server,
select and designate the second network element as a network proxy to the first network element, and
send, over the data communication network operating on the optical network, data encapsulated in a first packet from the application server to the second network element; and
a virtual network operating on the optical network,
wherein the virtual network is configured to implement a decentralized mesh protocol in a control plane that establishes a network link between the first network element and the second network element,
wherein the decentralized mesh protocol initiates network links between neighboring network elements,
wherein the second network element is configured to receive data encapsulated in a first packet over a data communication network,
wherein the second network element is configured to encapsulate, using the control plane, the data into a second packet, and
wherein the second network element is configured to act as the network proxy for sending the data encapsulated in the second packet to the first network element over the control plane implemented by the virtual network.

10. The system of claim 9, wherein the first network element or the second network element is an optical switch.

11. The system of claim 9, wherein the optical network further comprises:
a plurality of subnets, wherein the first network element and the second network element share one of the plurality of subnets.

12. The system of claim 9, wherein the optical network further comprises:
a plurality of network elements divided into a plurality of predefined groups,
wherein the first network element and the second network element are members of at least one of the plurality of predefined groups.

13. A non-transitory computer readable medium storing instructions for establishing an alternate pathway to an endpoint, the instructions, when executed by a computer processor, comprising functionality to:
determine that a network connection is lost over a data communication network between a first network element and an application server;
select a second network element from a virtual network operating on an optical network, the second network element comprising a network connection over the optical network to the application server, and a network connection to the first network element over the virtual network, wherein the virtual network implements a decentralized mesh protocol in a control plane that establishes a network link between the first network element and the second network element, wherein the decentralized mesh protocol initiates network links between neighboring network elements;
designate the second network element to act as a network proxy to the first network element;
send data encapsulated in a first packet from the application server to the second network element;
encapsulate, using the control plane and at the second network element, the data into a second packet; and
receive, over the control plane implemented by the virtual network, the data encapsulated in the second packet at the first network element using the second network element as the network proxy for the data.

14. The non-transitory computer readable medium of claim 13, wherein the instructions further comprise functionality to:
detect a fault between the first network element and the application server.

15. The non-transitory computer readable medium of claim 13, wherein the instructions further comprise functionality to:
send a message to the application server, wherein the message causes the application server to use the second network element as the network proxy.

16. The non-transitory computer readable medium of claim 13, wherein the instructions further comprise functionality to:
determine whether the second network element shares a subnet with the first network element; and
when the first network element and the second network element share the subnet, send a message to the virtual network, wherein the message modifies a node table or a link table for the subnet to route data from the application server to the first network element through the second network element.

* * * * *